(12) United States Patent
Feng

(10) Patent No.: US 8,307,432 B1
(45) Date of Patent: Nov. 6, 2012

(54) GENERIC SHELLCODE DETECTION

(75) Inventor: Hsiang-an Feng, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1065 days.

(21) Appl. No.: 12/247,025

(22) Filed: Oct. 7, 2008

(51) Int. Cl.
*G06F 21/00* (2006.01)
(52) U.S. Cl. .................. 726/22; 726/23; 726/24; 726/25
(58) Field of Classification Search .............. 726/22–25; 713/187–190; 711/163
See application file for complete search history.

(56) References Cited

U.S. PATENT DOCUMENTS

| | | | |
|---|---|---|---|
| 2002/0083334 A1* | 6/2002 | Rogers et al. ................. | 713/200 |
| 2004/0034794 A1* | 2/2004 | Mayer et al. .................. | 713/200 |
| 2005/0120242 A1* | 6/2005 | Mayer et al. .................. | 713/201 |
| 2008/0016314 A1* | 1/2008 | Li et al. ......................... | 711/200 |
| 2008/0022405 A1 | 1/2008 | Wang et al. | |

* cited by examiner

*Primary Examiner* — Justin T Darrow
(74) *Attorney, Agent, or Firm* — Beyer Law Group LLP

(57) ABSTRACT

Detecting buffer-overflow exploits scans generically for shellcode without using virus signatures and maintains close to a zero false-positive rate. Shellcode is detected generically without determining specifically which buffer-overflow exploit is being used. Protection is offered against unknown buffer-overflow exploits. A file is scanned to determine if a vulnerable buffer in that file includes suspect code that has characteristics of shellcode. Next, it is determined if the suspect code contains a routine to find the imagebase of Kernel32.dll using any of the techniques of PEB, TOS or SEH (process environment block, top of stack or structured exception handling). It is next determined if the suspect code contains a routine to search for APIs in the export table of kernel32.dll. Techniques for analyzing the suspect code include static analysis and executing the code in an emulator. A high sensitivity setting determines that shellcode is present when any of the techniques of PEB, TOS or SEH are found.

26 Claims, 8 Drawing Sheets

Access Imagebase of Kernel32

Access Imagebase of Kernel32

Access Using PEB

Access Using PEB

Access Using SEH

Access Using TOS

GENERIC SHELLCODE DETECTION

FIELD OF THE INVENTION

The present invention relates generally to the prevention of malware in a computer system. More specifically, the present invention is directed toward detecting buffer-overflow attacks and the use of shellcode.

BACKGROUND OF THE INVENTION

In the context of computer security and programming, a "buffer overflow" (or buffer overrun), is an anomalous condition where a function attempts to store data beyond the boundaries of a fixed-length buffer. The result is that the extra data overwrites adjacent memory locations. The overwritten data may include other buffers, variables and program flow data, and may result in erratic program behavior, a memory access exception, program termination or—relevant to this invention—introduction of malware into the computer system by a malicious user.

Buffer overflows can be triggered by inputs specifically designed to execute malicious code or to make the function operate in an unintended way. As such, buffer overflows cause many software vulnerabilities and form the basis of many malware attacks. A buffer overflow is a serious vulnerability in a computer system and can lead to a buffer-overflow attack (or "exploit"). These attacks include server break-ins, worms, zombies, robot networks ("botnets"), etc. Buffer-overflow attacks are a popular choice for these attacks because they provide substantial control over the victim's computer.

During a buffer-overflow exploit, code termed "shellcode" is typically passed into a vulnerable function as a string parameter. Shellcode is a small piece of code that forms the payload of the exploitation. It is termed "shellcode" because it often starts a command shell (but not always) from which the attacker gains control of the victim's machine. Shellcode is commonly written in machine code but any portion of code performing a similar task may be termed shellcode.

There are different types of shellcode. "Local" shellcode give an attacker control over the same machine on which it runs; it is used by an attacker who has limited access to a machine but exploits a vulnerability in a process on the machine that has higher privileges. This type of shellcode typically creates a shell executable. "Remote" shellcode is used when an attacker wants to target a vulnerable process running on another machine on a local network or Internet. "Download and execute" shellcode instructs the victim machine to download a certain executable file off of the network, save it to disk and execute it. One characteristic of shellcode is that it does not contain null characters because it is passed into a vulnerable function as a string parameter and strings are null-terminated. Shellcode is often encrypted to remove null characters and to further avoid detection.

Older technology uses specific virus signatures to detect exploits such as a buffer overflow attack. Its major disadvantage is its inability to detect new exploits. Whenever a new exploit is found, a new signature to detect has to be added to a pattern file, downloaded, installed and maintained. But, there are countless numbers of application files, and they contain many buffer overflow vulnerabilities. Waiting for a new exploit to be discovered and then adding a new pattern to detect the exploit is reacting to the threat, rather than proactively blocking it.

SUMMARY OF THE INVENTION

To achieve the foregoing, and in accordance with the purpose of the present invention, a technique is disclosed that detects buffer-overflow exploits.

In general, a generic technique for the detection of buffer-overflow exploit is performed by scanning for shellcode. The present invention is able to detect buffer-overflow exploits generically without using virus signatures and maintains close to a zero false-positive rate. In other words, the invention is able to detect a buffer-overflow exploit in general, without needing to determine specifically which buffer-overflow exploit it is. Furthermore, the intrusion detection rate is increased and protection is offered against unknown buffer-overflow exploits.

Shellcode typically is inserted as an input string parameter in a function. Because string parameters only contain visible ASCII characters, an input string can be analyzed to identify if it contains shellcode. Shellcode is identified if it contains a routine to find the imagebase of Kernel32.dll using either PEB, TOS or SEH. Shellcode is identified if it contains a routine to search for APIs in the export table of kernel32.dll.

Techniques for analyzing suspect code to determine if shellcode is present include performing a static analysis of the actual code or running the code in an emulator to see how it performs. Although an emulator can be easier it would take longer. Static analysis is used when it is desirable to perform the analysis faster without actually executing the suspect code.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
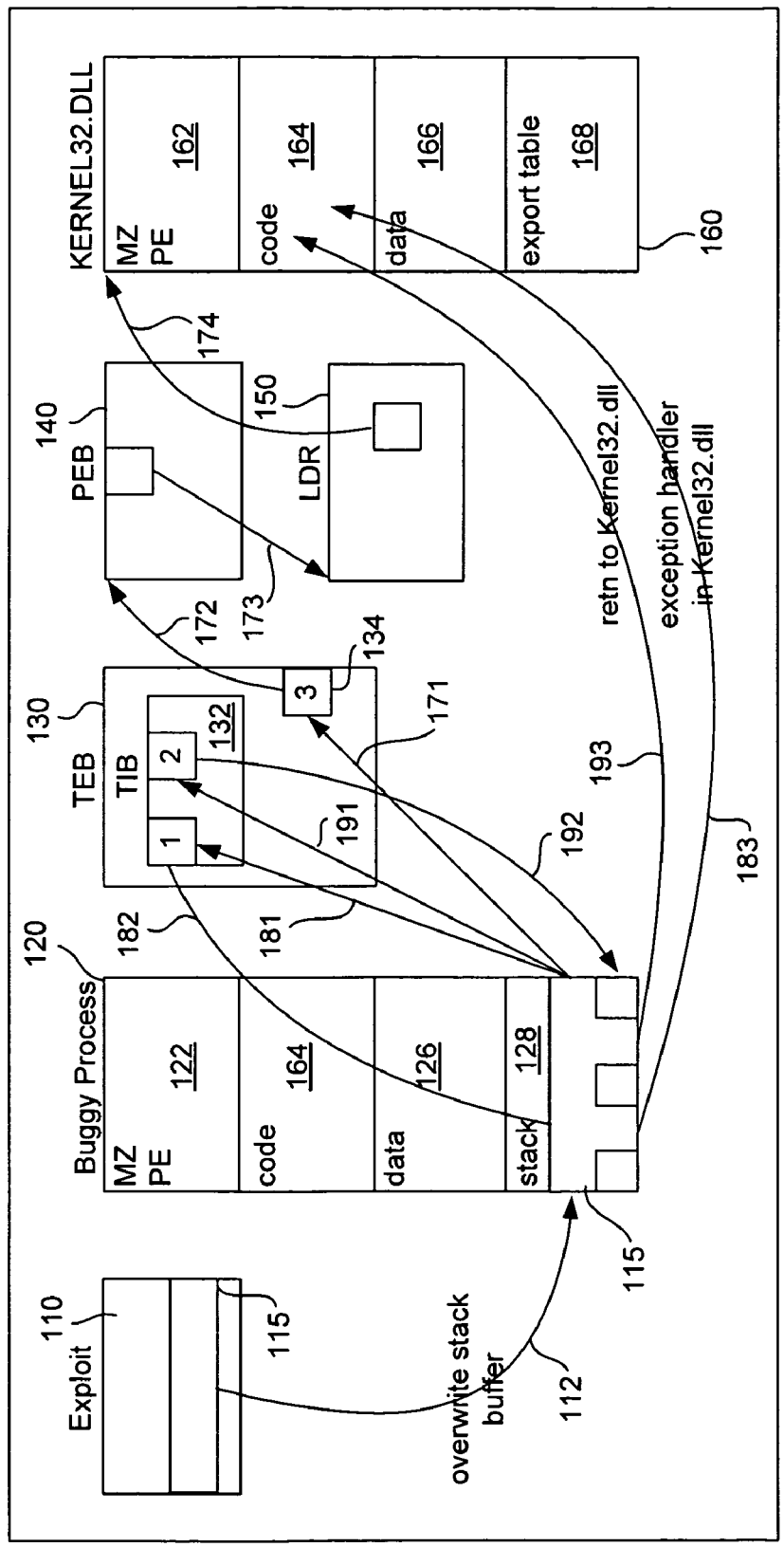
FIG. 1 is a block diagram illustrating in general how shellcode may access an imagebase.

As described above, buffer-overflow exploits attack a vulnerable program (or function or process) with an input string containing malicious code, i.e., the shellcode. The attack takes advantage of the fact that the vulnerable program performs faulty checking (or does not perform any checking) on the length of the input string, and can thus overwrite data on the stack. The malicious individual typically crafts the input string in such a way that it overwrites specific data entries on the stack, thus allowing the malicious code to take over control of execution.

A normal program accesses APIs as follows. Under a Microsoft operating system, the compiler builds an import table for all of the APIs needed by the executable code, and the loader updates the table entries with the actual API addresses at run time. But, when an exploit such as a buffer overflow attack executes under a Microsoft operating system (or under any similar operating system), the shellcode cannot call APIs directly. The shellcode needs to find the addresses of the APIs before the shellcode can call these functions. The shellcode needs to find the imagebase of the DLL that it needs. Next, the shellcode searches in the export table of the DLL for the APIs it wishes to call. Or, the shellcode finds the imagebase of Kernel32.dll, and then searches the export table for functions LoadLibrary and GetProcAddress which can be used to get the address of any API available in the system. Thus, the shellcode simply calls one of these two functions to determine the addresses of any other APIs that the shellcode requires.

Therefore, the shellcode needs to find the imagebase of kernel32.dll. Because the imagebases of DLLs vary for different DLL versions, it is impractical for the shellcode to jump to a static address to search for the kernel32.dll image in memory. There are three ways that malware finds the imagebase of kernel32.dll: through the process environment block (PEB), by using structured exception handling (SEH), and via a top-of-stack (TOS) technique. All of the buffer-overflow exploits in a Microsoft operating system use one of these three techniques to retrieve the imagebase of kernel32.dll.

It is realized that buffer-overflow exploits may be detected by scanning for string literals in a file that appear to be valid, executable x86 binary code. Next, it is possible to search executable code for code that jumps to the imagebase of kernel32.dll through any of the PEB, SEH, or TOS. Finally, it is possible to search this executable code for code that parses the API names in the name table of the export table and accesses the other tables. Since all buffer-overflow exploits perform these actions, it is possible to generically detect all such exploits, both known and unknown, by scanning for these specific actions. In addition, because few actual strings look like executable code, and even fewer have code that searches for the imagebase of Kernel32.dll and that searches for API names, this detection method will have a minimal false-positive rate.

If the shellcode is encrypted it will also contain a decryption routine. Therefore, if a decryption routine is found within an input string the input string is decrypted using the routine before the input string is checked for shellcode characteristics.

Overview

FIG. 1 is a block diagram 100 illustrating in general how shellcode may access an imagebase. Shown is exploit code 110 that contains the shellcode 115 (often within a buffer), a buggy or faulty process 120, a thread environment block (TEB) 130, a process environment block (PEB) 140, a loader data record (LDR) 150 and a dynamic link library 160 named "kernel32.dll" (hereinafter "kernel32"). Exploit 110 is any document, program or buffer that contains shellcode 115. As known in the art, shellcode 115 is typically wrapped up in other code, data or buffers. Once a process such as 120 inputs an input string (for example) without checking, and shellcode is present, the buffer will overflow and the shellcode will be able to take control of the computer. Typically, buffers present in a Word document, Excel document, PowerPoint document or other documents contain the shellcode and these buffers are read in without performing checking on their length. Other techniques may also be used by malware to introduce shellcode into the stack of a process.

Process 120 includes header 122, code 124, data 126 and stack 128. As shown, via a vulnerability, shellcode 115 is introduced via 112 into stack 128. Process 120 is any function, process or program that is vulnerable to being taken over by shellcode. Header 122 includes typical Microsoft executable headers MZ and PE; as known, typically code 124 and data 126 are kept in separate sections of the process, and stack 128 is allocated during run time (i.e., it doesn't exist statically within the file). The stack is usually a smaller buffer including dynamic data, local variables and input from any command line. Thus, if a function reads in input from a command line, this input will be stored on the stack. The stack includes a return address for the process, and when a buffer overflow attack occurs, a return address in the stack is overwritten by the shellcode, thus allowing the shellcode to gain control.

Block 130 also includes thread information block (TIB) 132 containing various pointers, and also pointer 134. Block 140 includes a pointer to loader data record 150, which in turn includes a pointer to kernel32 160. Kernel32, as known in the art, includes a header 162, code 164, data 166 and an export table 168.

As pointed out above, shellcode 115 typically uses one of three different techniques in order to find kernel32 in memory. In one technique, the shellcode uses pointers 171-174 in order to find kernel32 via the process environment block 140. In a second technique, the shellcode uses pointers 181-183 to access kernel32 using structured exception handling (SEH). In a third technique, the shellcode uses pointers 191-193 to access kernel32 via a "top-of-stack" (TOS) technique. Each of these techniques will be described in more detail below.

Block Diagrams for Different Embodiments

As pointed out above, shellcode typically finds the imagebase of kernel 32 using the three techniques of PEB, SEH or TOS. This is necessary because the imagebase of kernel32 is different for different versions of a Microsoft operating system and because updates to a version can also change the location of the imagebase. The shellcode is looking for the starting address of that image in memory.

Figure 2A:
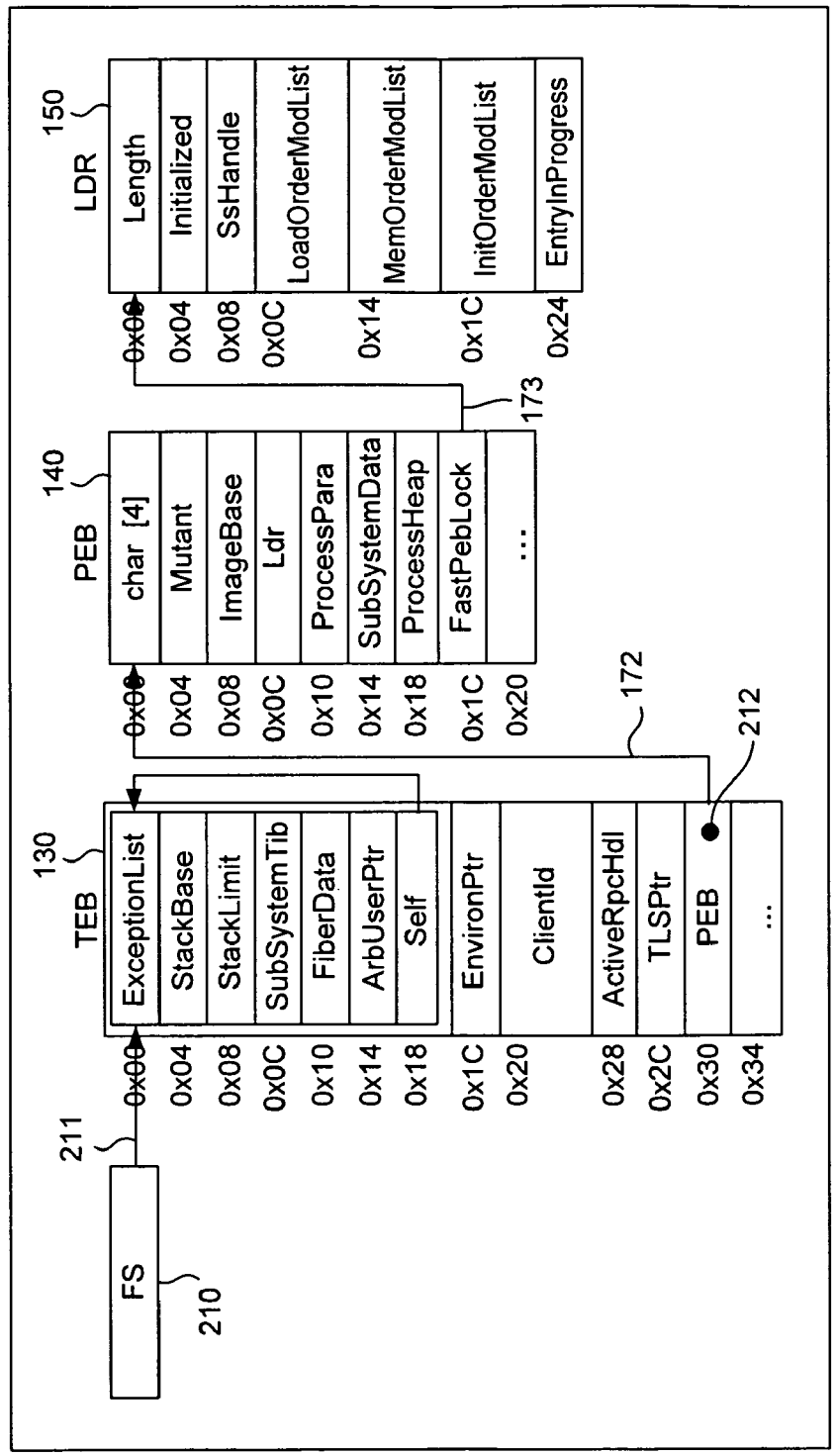
FIG. 2 is a block diagram illustrating how the shellcode uses the process environment block (PEB).

FIG. 2A is a block diagram 200 illustrating how the shellcode uses the process environment block (PEB). Shown are the blocks from the previous figure and various pointers. Register FS 210 is a register in the CPU available to all programs providing a value that results in a pointer 211 to TEB 130. At an offset of 0x30 (30 hexadecimal) in that block is a value 212 that provides a pointer 172 to the PEB 140. Similarly, an offset of 0x0C in that block is a value providing a pointer 173 to the LDR 150. The shellcode may simply follow links 211, 172 and 173 in order to find the LDR 150.

Figure 2B:
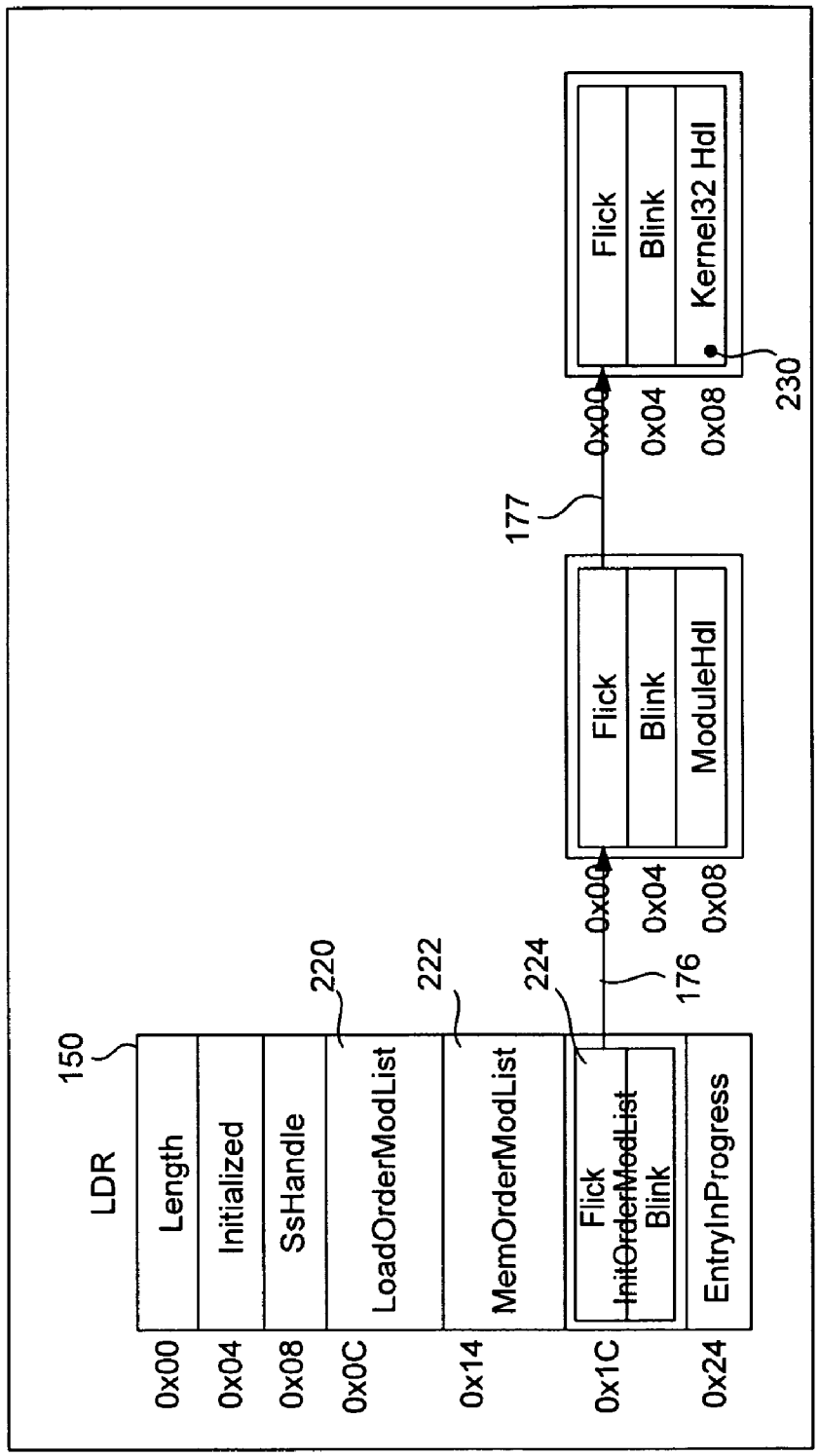

FIG. 2B is a further block diagram 260 illustrating how the shellcode uses the process environment block (PEB). Shown is LDR 150 and a linked list accessed by pointers 176 and 177. Within LDR at an offset of 0x0C is a list 220 that is a list of all modules (or DLLs) ordered by their time of loading. Within LDR at an offset of 0x14 is a list 222 that is a list of all modules ordered by their address in memory. Within LDR at an offset of 0x1C is a list 224 that is a list of all modules ordered by their initialization order. This list 224 is termed "InitOrderModList." This list is a linked list of records, each record containing a forward link, a backward link and a pointer to a particular module or DLLs. Malware writers have discovered that the module kernel 32 is always initialized second within the Microsoft operating system. Thus, following links 176 and 177 leads to the module initialized second, which is kernel32, and value 230 at an offset of 0x08 provides the starting address of the imagebase of that module.

Figure 3:
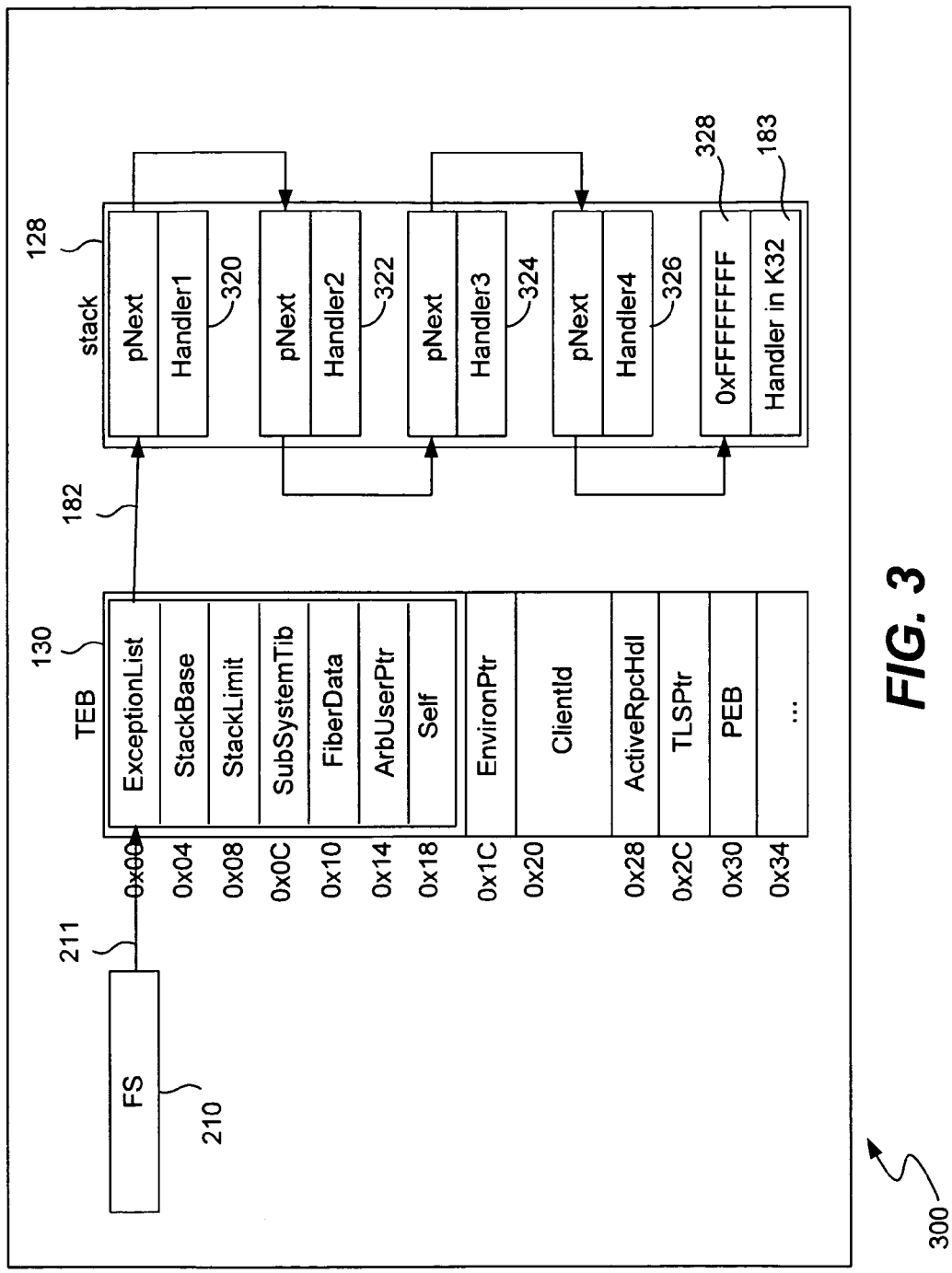
FIG. 3 is a block diagram illustrating how the shellcode uses structured exception handling (SEH) to access the imagebase of kernel32.

FIG. 3 is a block diagram 300 illustrating how the shellcode uses structured exception handling (SEH) to access the imagebase of kernel 32. As shown, this figure includes the FS register 210, TEB 130 and the stack 128 of the process 120. The concept of structured exception handling allows programs and processes under a Microsoft operating system to handle exceptions that occur during execution of software. Any function within a process or program can plant an exception handler on the stack of the process. Each exception handler may come from a different function or many handlers may come from the same function. When an exception occurs, the handlers are queried as to whether they wish to handle the exception. Shown in stack 128 is a linked list of exception handler records 320-328. Each record includes a pointer to the next exception handler, and the address of that particular handler. The Microsoft operating system will automatically insert a special exception handler in the last position of the linked list. This exception handler is for use when software crashes and provides the address of a handler within kernel32. In this example, address 183 in handler record 328 provides a pointer to the exception handler in the code section of kernel32.

In order for the shellcode to find the imagebase of kernel32 it first retrieves the FS register 210 which provides a link 211 to the TEB, and then at an offset of 0 it finds a pointer 182 to the linked list of exception handler record pairs in the stack. Next, it then reads the first value in each record (the pointer to the next record) until it finds a value of "−1" (a hexadecimal value of "0xFFFFFFFF") which indicates that the last record has been reached. It then retrieves the next entry in that record which is the address 183 of the exception handler somewhere in the code section 164 of kernel 32. The shellcode then traces backward in memory looking for the beginning of the imagebase. It may do this by looking for the header information (MZ and PE) and by looking for an address which is a multiple of 10,000 hexadecimal. Because it is known that all imagebases under the Microsoft operating system are aligned at each 10,000 hexadecimal, if the shellcode does not find the beginning of the imagebase for kernel32 when it first encounters a multiple of 10,000 hexadecimal, it simply jumps back 10,000 hexadecimal bytes more looking for the beginning of kernel32. In this manner, the shellcode uses structured exception handling (SEH) to find the beginning of the imagebase for kernel 32.

Figure 4:
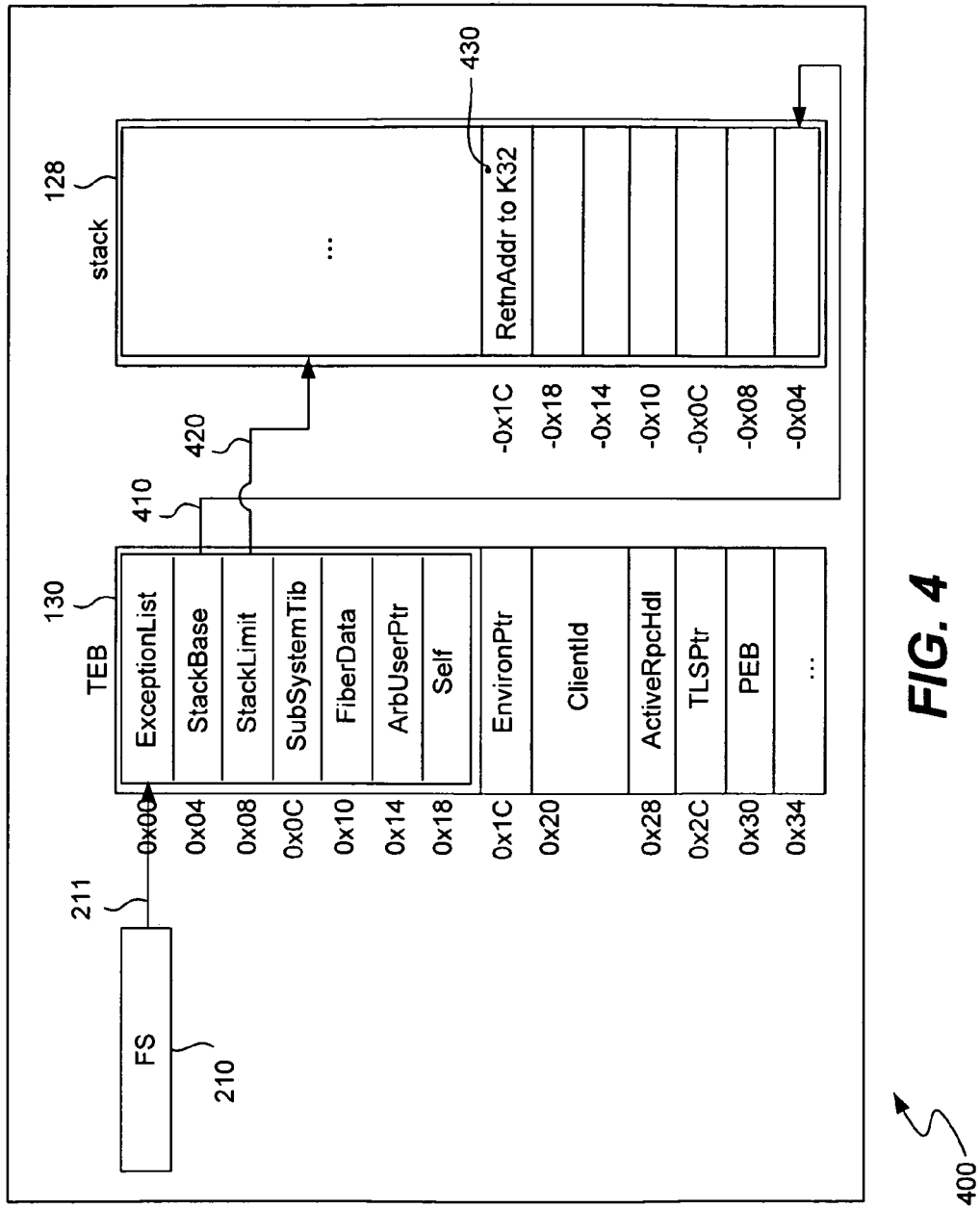
FIG. 4 is a block diagram illustrating how the shellcode uses a "top of stack" technique (TOS).

FIG. 4 is a block diagram 400 illustrating how the shellcode uses a "top of stack" technique (TOS). As known in the art, when a program launches, Windows Explorer loads the program using one of two processes. It either calls "CreateProcess" or "CreateThread" to perform loading and both of these processes are located in kernel32. Thus, because of this process, stack 128 of process 120 will include the return address of a location somewhere inside kernel32. As shown in FIG. 4, stack 128 includes address 430 which is a location inside kernel32.

In order for the shellcode to find the imagebase of kernel32 it first retrieves the FS register 210 which provides a link 211 to the TEB, and then at an offset of 0x04 it finds a pointer 410 to the bottom of the stack "Stack Base." At an offset of 0x08 it finds a pointer 420 to the top of the stack "Stack Limit." Because it is known that the return address for the location inside kernel32 430 is always a distance of 0x1C away from the base, the shellcode can access the stack base and then use that offset of 0x1C to find the location 430. Once it has this address of a location somewhere inside the imagebase of kernel32, it uses the technique described above with reference to FIG. 3 to trace backwards in memory looking for the signatures of MZ and PE in order to find the top of the imagebase. In this manner, the shellcode uses a top-of-stack technique to find the beginning of the imagebase for kernel32.

This technique is the least reliable technique and the least commonly used by shellcode because some implementations of the Microsoft operating system store the return address for kernel32 at an different offset from the base of the stack.

Figure 6:
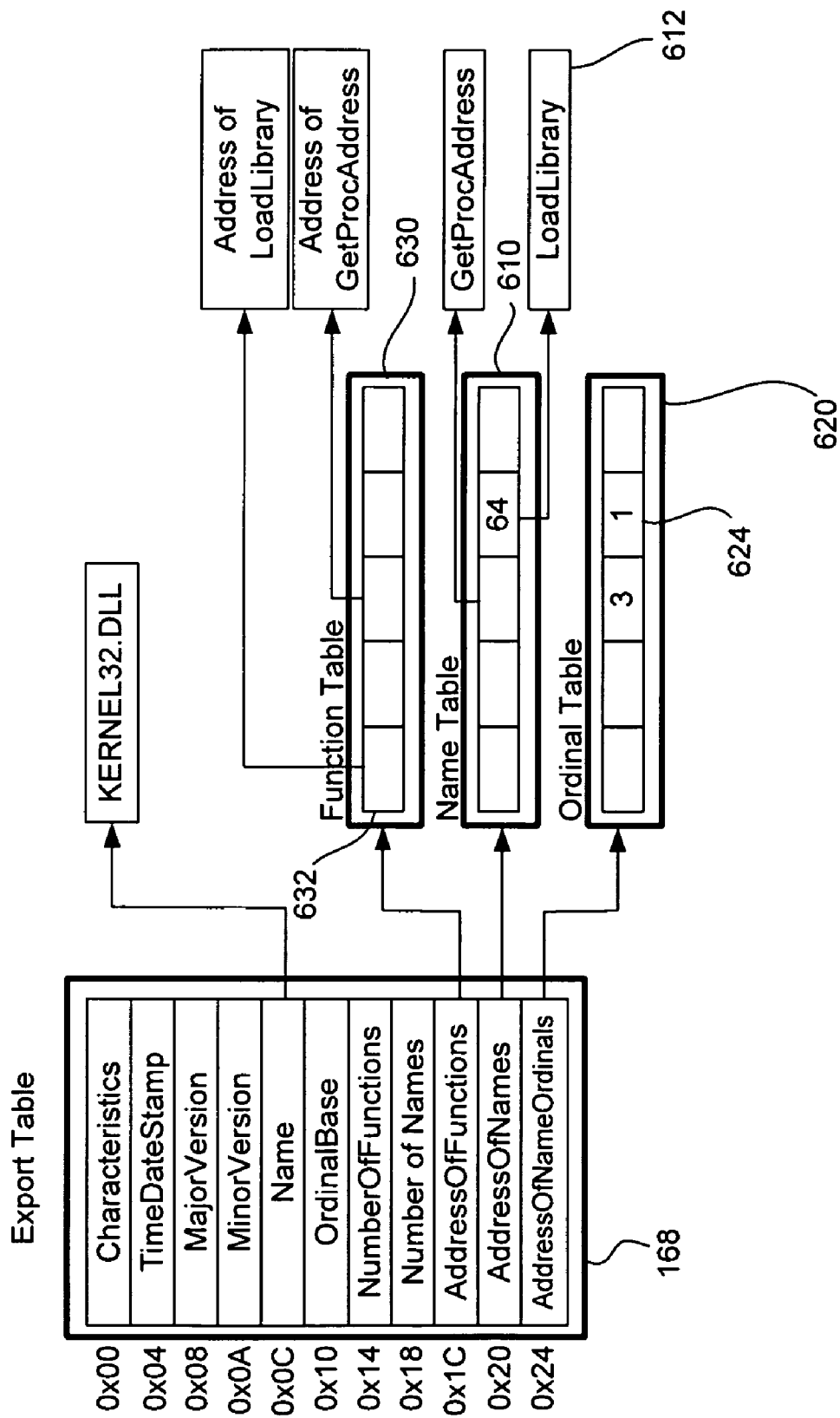
FIG. 6 is a block diagram illustrating components of the export table in kernel32.

FIG. 6 is a block diagram illustrating components of export table 168 in kernel 32. As known in the art, the export table includes three sub-tables and these three sub tables are illustrated very simplistically in FIG. 6. A name table 610 provides the names of all APIs that are exported by this particular DLL. Basically, the name table includes the names of all available APIs in the DLL. The ordinal table 620 provides the corresponding ordinal numbers for the APIs in the name table. This ordinal value provides an index 624 into the function table. The function table 630 provides addresses for these APIs. Index 624 provides the address for API LoadLibrary 632.

Once the shellcode has accessed the imagebase of kernel32, it then accesses export table 168, and, providing the name of an API that it wishes to use (such as LoadLibrary or GetProcAddress), it follows links 614 and 624 to the various sub-tables in order to find the address of that particular API (for example, LoadLibrary 632). It is then able to utilize the APIs LoadLibrary and GetProcAddress in order to find any other APIs it wishes to use. Alternatively, if it only needs APIs in kernel32, it may search for these APIs in these tables directly, without utilizing LoadLibrary and GetProcAddress.

Overall Flow Diagram

Figure 5:
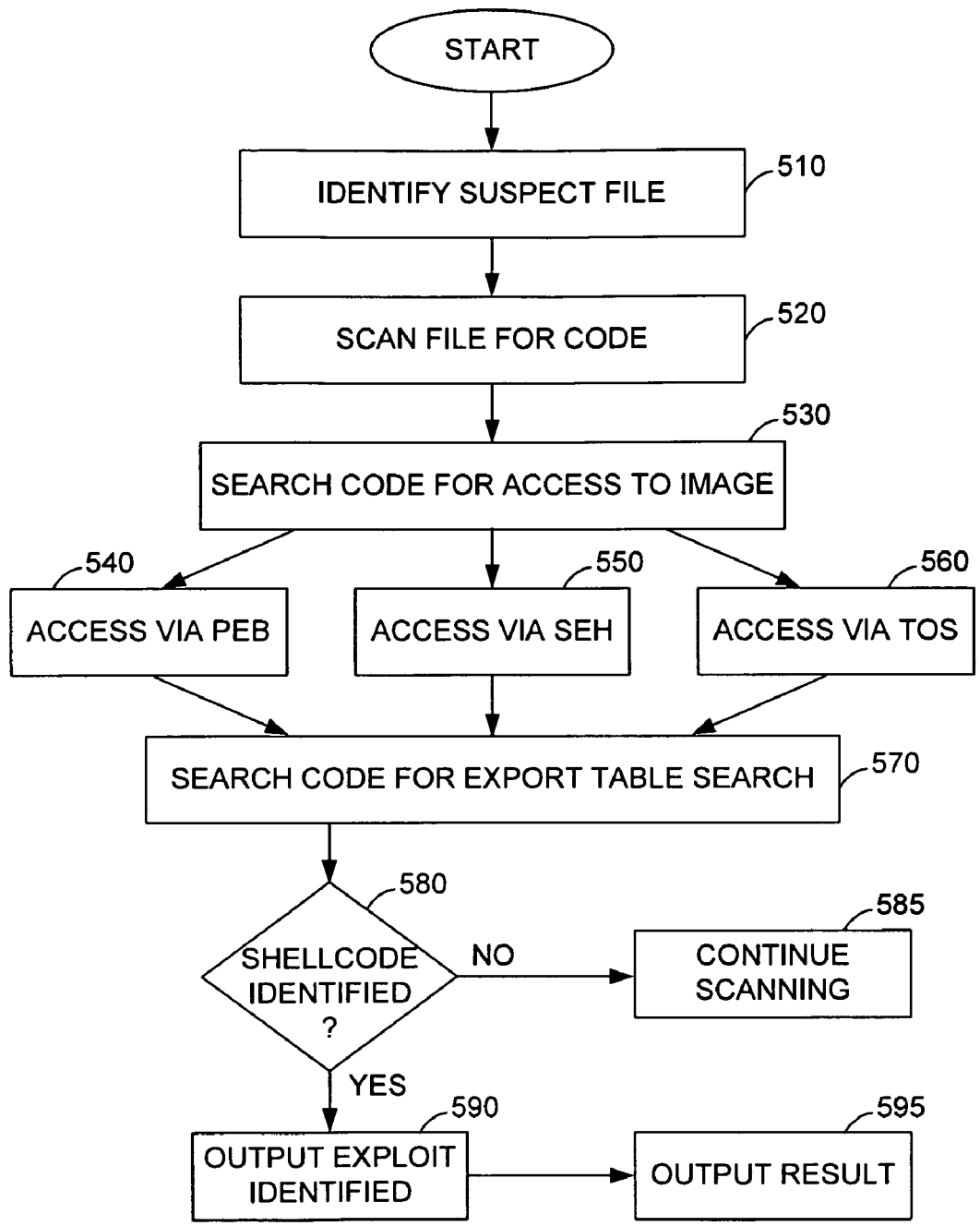
FIG. 5 is a flow diagram describing a technique for detecting generic shellcode.

FIG. 5 is a flow diagram describing a technique for detecting generic shellcode. In a first step 510, a suspect file or buffer is identified. The present invention is suitable for scanning any and all files on a computer, and any accessible buffer in memory or in a file on a hard disk or other storage. Further, the present invention may be part of any automatic scanning technique or scanning tool that automatically scans files on a computer, or may be part of a real-time scan that only scans a file when: a file is opened, a program is run, a file is downloaded, etc. Preferably, as described below, it may not be necessary to scan an entire file, but only scan particular suspect portions of a file. Once a file or buffer is identified for further analysis, control move to step 520.

Step 520 determines whether the file or buffer contains suspicious code, in other words, executable code that resembles shellcode. If a file is being examined, there are known vulnerabilities in certain types of files and these known vulnerabilities indicate where to look for suspicious characteristics. In other words, a particular vulnerability of a particular type of file will indicate a buffer that should be examined. This step then, focuses on that particular buffer or buffers. For example, Excel documents have a vulnerability in a buffer related to the number of columns (CVE-2007-0030), and that particular buffer will be scanned for suspicious code. Or, Flash files have a known scripting vulnerability where checking of a header is faulty and can result in an exploit (CVE-2007-6019). Or, Word documents have known vulnerabilities concerning handling malformed data, such as the one described in CVE-2008-2244 which allows remote attackers to execute arbitrary code. The present invention thus looks in the buffer associated with a particular vulnerability, and then scans that buffer. Details on Common Vulnerabilities and Exposures (CVE) records are known in the art and can be found at http://www.cve.mitre.org (available from the National Cyber Security Division of the U.S. Department of Homeland Security in conjunction with the Mitre Corporation. It is possible to scan the entire file, although this is less efficient than scanning buffers of files associated with known vulnerabilities as explained above.

If a buffer is identified in step 520 instead of a file, the entire buffer may be scanned for suspicious code. One indication of suspicious code is very long strings in input buffers. As most shellcode has a minimum length of about 40 bytes, this step may flag a file or buffer as suspicious if an input string is greater than 40 bytes. Of course this value may be decreased to increase the sensitivity of the invention, although decreasing the value can lead to less efficiency if scanned files and buffers actually do not include shellcode.

A determination that an input buffer string is greater than a minimum of 40 bytes (for example) may be enough to indicate that shellcode is likely present and control moves to step 530. Other types of files may have different suspicious characteristics leading to a determination that shellcode is likely present. For example, JavaScript files and HTML files are known to display mostly readable words. It would be uncommon for these files to include a lot of binary code for execution that is not readable. It is known that representation of binary code for execution in these files is typically preceded by a "%". In other words, executable binary code may be encoded in these files (by malware) using readable ASCII.

For example, the binary value 0x41 is encoded as "%41". If a large number of "%" characters are found within a string literal in one of these types of files, and decoding them reveals binary characters that are outside the range of visible ASCII, then it is a good indication that a shellcode may be present, and control moves to step 530.

Since all three known methods to find the kernel32 imagebase (PEB, SEH, and TOS) start with accessing the FS register, we can search in suspicious files or buffers for CPU operations that do that operation. Or, we can simply look for executable binary code in non-executable files. For example, a normal Word document should not contain syntactically correct x86 binary code in an overly long sequence, because it is meant to contain mainly text. Again, we can set the minimum length to 40 bytes, or adjust according to sensitivity. If such a buffer is present, it may be a shellcode.

If no determination is made in step 520 that the current file or buffer being scanned is likely to contain executable shellcode, then the next file or buffer is processed.

Step 530 determines whether the suspect code that has been identified in step 520 includes techniques for accessing the imagebase of kernel32. As pointed out above, it is necessary for shellcode to access the imagebase of kernel 32 in order to find the APIs LoadLibrary and GetProcAddress. If it is determined that the suspect code includes techniques for accessing this imagebase, then a determination is made that it is likely that the suspect code (and thus the buffer, file a program that includes the suspect code) is a shellcode and malware is present. A result may be output at this time (described below at step 595) indicating that malware is present, or, flow may continue to do step 570. If the invention is implemented with sensitive settings, then a positive determination in step 530 results in a determination of malware, while a less sensitive setting may require a positive determination both in step 530 and in step 570.

Step 530 may be implemented in different manners. Since it is known that shellcode typically finds the imagebase of kernel32 using one of three techniques, steps 540, 550 and 560 are each executed to determine if the suspect code is utilizing any of these techniques. Alternatively, flow may be implemented by simply determining if the technique of step 540 is being executed as this is the most reliable technique and the most common technique used by shellcode. Or, any combination of these three techniques may be analyzed.

Step 540 determines if the suspect code accesses the imagebase of kernel 32 using the PEB. The suspect code is typically within a short call buffer that is analyzed. Because it is known that shellcode will use the values and pointers shown in FIGS. 2A and 2B, one technique is to look for specific instructions and offsets used by the shellcode. In this technique a particular offset is looked for without regard to any operator. For example, a first step is "retrieve FS." Next, an access using offset 0x30 in the TEB is performed, followed by an access using offset 0x0C in the PEB, an access using offset 0x1C in the LDR, a read with an offset of 0, followed by a read with an offset of 0x08. If these offsets are found in this order then it is determined that shellcode is accessing the imagebase using PEB. Other techniques such as reverse engineering the suspect code or a binary analysis of the CPU instructions may also be used. Alternatively, an emulator may be used to run the steps in the call buffer to determine if the imagebase of kernel 32 is being accessed at its starting position. An emulator is less desirable as it takes more time.

As pointed out above, accessing the imagebase via the PEB is the most reliable technique and is most commonly used by shellcode. The shellcode must access the imagebase in order to find the functions LoadLibrary and GetProcAddress; using these functions, the shellcode can get the address of any API in any DLL.

Step 530 may also attempt to determine if the suspect code is searching for the imagebase of kernel 32 via structured exception handling (SEH) by executing step 550. As in step 540, step 550 performs a call analysis of the suspect code to determine if it is performing the steps as shown in FIG. 3. For example, the step first looks for code that retrieves register FS 210. Next, it looks for accessing the first entry of the TEB at an offset of 0, and then it looks for a comparison of the first record in each of the exception handling records to the value of "−1". Once the shellcode finds the last exception handler, the analysis than looks for retrieving the next parameter of that final record (the address of the exception handler in kernel32). Next, the analysis looks for code that traces backwards in memory and is looking for a header by making comparisons to the signatures of MZ and PE which are "MZ" and "PE\0\0" respectively. Typically, the code that traces backwards in memory looking for comparisons to the signatures of MZ and PE is a loop because the shellcode does not know exactly how far it must trace backwards. Alternatively, an emulator may be used to emulate the operation of the suspect code to see if it finds the imagebase of kernel32 using this structured exception handling technique. If these instructions, offsets, and comparisons are found in this order then it is determined that the shellcode is accessing the imagebase using SEH. Of course, a less sensitive implementation of this analysis would require a near exact match of all of these steps that the shellcode is performing, while a very sensitive implementation would produce a positive result if only some of these instructions, offsets and comparisons are found in a particular order.

Step 530 may also attempt to determine if the suspect code is searching for the imagebase of kernel32 via a "top of stack" technique (TOS) by executing step 560. As in step 540, step 560 performs a call analysis of the suspect code to determine if it is performing the steps as shown in FIG. 4. For example, the step first looks for code that retrieves register FS 210.

Next, it looks for accessing the entries of the TEB at an offset of 0x04 and 0x08, namely, accessing the stack base and the stack limit. Next, the analysis determines if the suspect code is using offset of 0x1C from the stack base (in order to find address 430 of a location somewhere inside the imagebase). Next, the analysis looks for code that traces backwards in memory and is looking for a header by making comparisons to the signatures of MZ and PE which are "MZ" and "PE\0\0" respectively. Typically, the code that traces backwards in memory looking for comparisons to the signatures of MZ and PE is a loop because the shellcode does not know exactly how far it must trace backwards. Alternatively, an emulator may be used to emulate the operation of the suspect code to see if it finds the imagebase of kernel32 using this top-of-stack technique. If these instructions, offsets, and comparisons are found in this order then it is determined that the shellcode is accessing the imagebase using TOS. Of course, a less sensitive implementation of this analysis would require a near exact match of all of these steps that the shellcode is performing, while a very sensitive implementation would produce a positive result if only some of these instructions, offsets and comparisons are found in a particular order.

Once the analysis of the suspect code has performed any of the analyses in steps 540, 550 and 560 (or all of these steps) then control moves to step 570. At this point, if any of steps 540, 550 or 560 have produced a positive result then a more sensitive implementation of the present invention would move directly to step 590 and output a result indicating that malware has been discovered. Alternatively, a less sensitive implementation of this invention—which would produce fewer false positives—would then execute steps 570 and 580 to determine if the suspect code is searching the export table of kernel32.

Next, in step number 570 this analysis of the present invention searches the suspect code to determine if the suspect code is performing a search of the export table 168 of kernel32. As discussed above with reference to FIG. 6, the shellcode accesses the name table 610 through the pointer in offset 0x20 in the export table, the ordinal table 620 through the pointer in offset 0x24 and then the function table 630 through the pointer in offset 0x1C in order to retrieve the address of an API that it wishes to use. The suspect code is then analyzed in this step to determine if it is accessing each of these tables in turn in order to find the address of an API; suspect code would do this by first parsing all the API name strings in the name table to find the ones it is looking for. The search can be performed using either character-by-character comparison or a string checksum comparison. Once a name has been found, the index (the number of entry in the table) is used to retrieve its ordinal number from the ordinal table. Then, the ordinal is used to index into the function table to obtain the address of the API. For example, in FIG. 6, LoadLibrary 612 is the fourth entry in the name table 610, so its ordinal number is the fourth entry in the ordinal table, which is 1. This means the address of LoadLibrary is stored in the first entry in the function table.

First, the analysis looks for access to offset 0x20 in the export table (to find the name table), and a loop to parse all strings in the table. Next, it looks for access to offset 0x24 in the export table (to find the ordinal table), and accessing that table to retrieve an ordinal number. Then, it looks for access to offset 0x1C in the export table (to find the function table), and using the ordinal number retrieved earlier to obtain the address of the target API. This entire procedure may be placed inside a loop, which may be performed as many times as the number of APIs the shellcode is trying to find.

In step 580 it is determined if the suspect code is searching the export table for the address of an API. If so, then in step 590 it is determined that an exploit has been identified (such as a buffer overflow exploit that uses shellcode) and an output result is provided in step 595. This result may include an audible or visual warning to the user, such as a warning not to open a particular program, or a warning that a particular program, file or buffer is suspected of containing shellcode, and thus is infected by malware. Or, a file or program is blocked from being opened or from running. On the other hand, if it is determined in step 580 that the suspect code is not performing a search of the export table, then it may be determined in step 585 that no malware is present and the present invention continues scanning other files and buffers. If the present invention is implemented with a sensitive setting, then even if the suspect code is determined not to be searching the export table in step 570, an output warning may still be given in step 595 if it is determined that one of the access techniques of steps 540, 550 or 560 has been found in the suspect code. Other actions may include quarantining or deleting the file. If the shellcode is contained in an internet packet from an external source, we may add a rule in the firewall to block the sender.

Computer System Embodiment

Figure 7A:
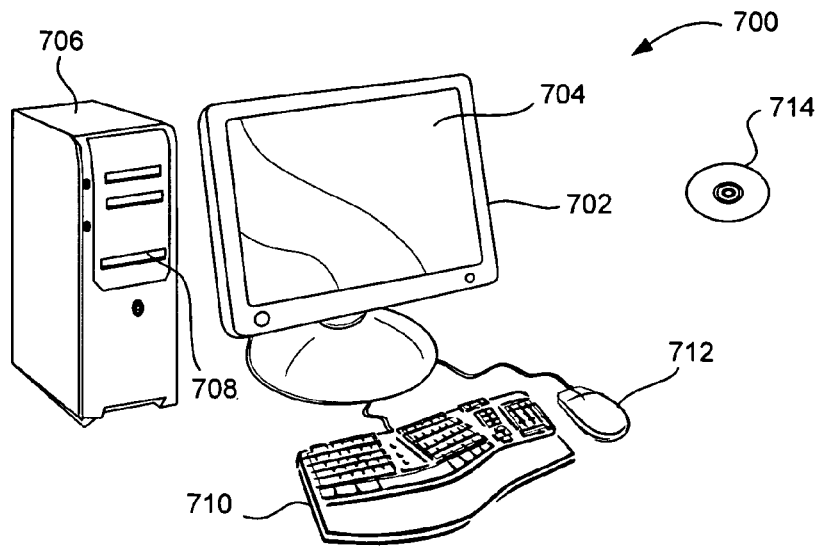
FIGS. 7A and 7B illustrate a computer system suitable for implementing embodiments of the present invention.
Figure 7B:
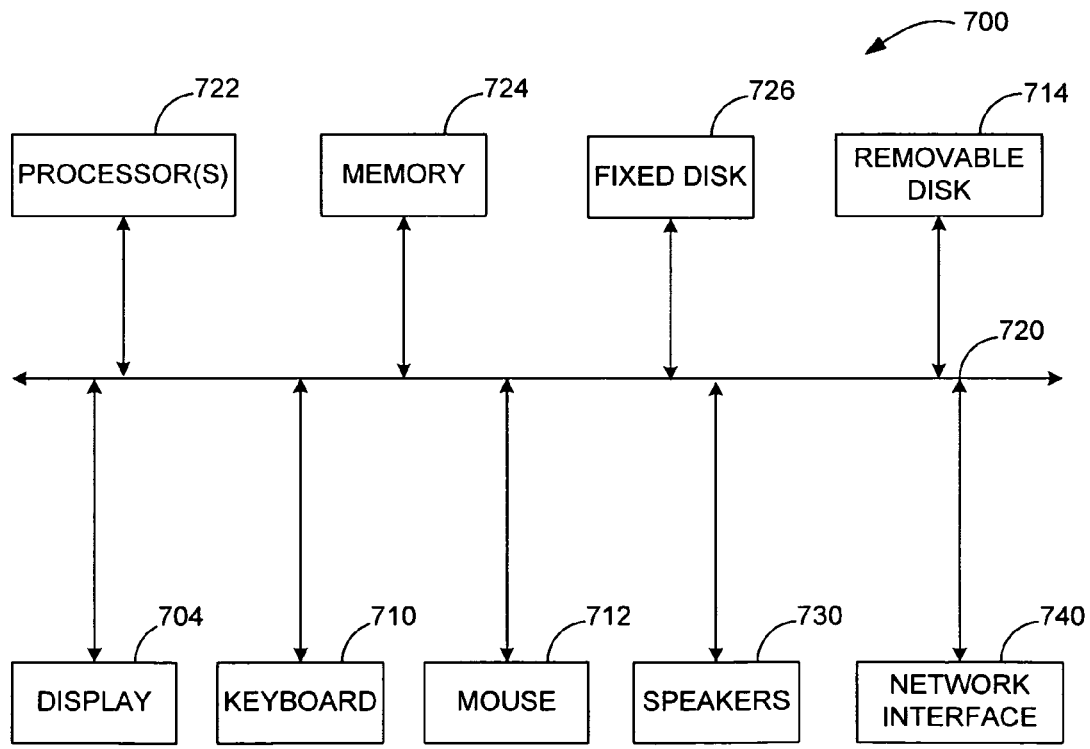

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of detecting malware in a computer system having an operating system, said method comprising:
   identifying a file in said computer system for analysis;
   scanning said file for suspect code that has characteristics of shellcode;
   determining that shellcode is likely present in said suspect code of said computer file;
   analyzing said suspect code to determine if said suspect code accesses the imagebase of kernel32.dll using a process environment block (PEB) of said operating system;
   determining that said suspect code includes executable code to access the imagebase of kernel32.dll using said PEB; and
   taking an action within said computer system when it is determined that said suspect code includes said executable code.

2. A method as recited in claim 1 further comprising:
   analyzing said suspect code to determine if said suspect code searches the export table of said kernel32.dll; and
   taking said action within said computer system only when it is determined that said executable code accesses the imagebase of kernel32.dll using said PEB and that said suspect code searches the export table of said kernel32.dll, whereby fewer false positives are generated.

3. A method as recited in claim 1 wherein said second determining step is implemented using a static analysis or an emulator.

4. A method as recited in claim 1 wherein said taking an action includes outputting a warning to a user of said computer system that malware is present in said file, blocking said file from being opened, blocking said file from executing, or flagging that said file includes malware.

5. A method as recited in claim 1 further comprising:
   identifying a vulnerable buffer of said file; and
   scanning said file for said suspect code by using said vulnerable buffer.

6. A method as recited in claim 1 further comprising:
   setting a sensitivity setting to a particular setting; and
   taking said action only when said sensitivity setting is at or above said particular setting.

7. A method as recited in claim 1 wherein said characteristics include an input string being longer than a minimum length or unreadable executable code present within an HTML file.

8. A method as recited in claim 1, wherein the analyzing said suspect code to determine if said suspect code accesses the imagebase of kernel32.dll using a process environment block (PEB) of said operating system includes examining offsets in the suspect code without regard to any operator within said suspect code, wherein a specific combination of offsets in a particular order signifies access of the imagebase of kernel32.dll using said PEB.

9. A method as recited in claim 1, wherein the analyzing said suspect code to determine if said suspect code accesses the imagebase of kernel32.dll using a process environment block (PEB) of said operating system is a static analysis performed without using an emulator.

10. A method of detecting malware in a computer system having an operating system, said method comprising:
    identifying a file in said computer system for analysis;
    scanning said file for suspect code that has characteristics of shellcode;
    determining that shellcode is likely present in said suspect code of said computer file;
    analyzing said suspect code to determine if said suspect code accesses the imagebase of kernel32.dll using an exception handler of said operating system;
    determining that said suspect code includes executable code to access the imagebase of kernel32.dll using said exception handler; and
    taking an action within said computer system when it is determined that said suspect code includes said executable code.

11. A method as recited in claim 10 further comprising:
    analyzing said suspect code to determine if said suspect code searches the export table of said kernel32.dll; and
    taking said action within said computer system only when it is determined that said executable code accesses the imagebase of kernel32.dll using said exception handler and that said suspect code searches the export table of said kernel32.dll, whereby fewer false positives are generated.

12. A method as recited in claim 10 wherein said second determining step is implemented using a static analysis or an emulator.

13. A method as recited in claim 10 wherein said taking an action includes outputting a warning to a user of said computer system that malware is present in said file, blocking said file from being opened, blocking said file from executing, or flagging that said file includes malware.

14. A method as recited in claim 10 further comprising:
    identifying a vulnerable buffer of said file; and
    scanning said file for said suspect code by using said vulnerable buffer.

15. A method as recited in claim 10 further comprising:
    setting a sensitivity setting to a particular setting; and
    taking said action only when said sensitivity setting is at or above said particular setting.

16. A method as recited in claim 10 wherein said characteristics include an input string being longer than a minimum length or unreadable executable code present within an HTML file.

17. A method as recited in claim 10, wherein the analyzing said suspect code to determine if said suspect code accesses the imagebase of kernel32.dll using an exception handler of said operating system includes examining whether the suspect code traces backwards in memory looking for a header.

18. A method as recited in claim 10, wherein the analyzing said suspect code to determine if said suspect code accesses the imagebase of kernel32.dll using an exception handler of said operating system is a static analysis performed without using an emulator.

19. A method of detecting malware in a computer system having an operating system, said method comprising:
identifying a file in said computer system for analysis;
scanning said file for suspect code that has characteristics of shellcode;
determining that shellcode is likely present in said suspect code of said computer file;
analyzing said suspect code to determine if said suspect code accesses the imagebase of kernel32.dll using a top-of-stack technique (TOS);
determining that said suspect code includes executable code to access the imagebase of kernel32.dll using said TOS technique; and
taking an action within said computer system when it is determined that said suspect code includes said executable code.

20. A method as recited in claim 19 further comprising:
analyzing said suspect code to determine if said suspect code searches the export table of said kernel32.dll; and
taking said action within said computer system only when it is determined that said executable code accesses the imagebase of kernel32.dll using said TOS technique and that said suspect code searches the export table of said kernel32.dll, whereby fewer false positives are generated.

21. A method as recited in claim 19 wherein said second determining step is implemented using a static analysis or an emulator.

22. A method as recited in claim 19 wherein said taking an action includes outputting a warning to a user of said computer system that malware is present in said file, blocking said file from being opened, blocking said file from executing, or flagging that said file includes malware.

23. A method as recited in claim 19 further comprising:
identifying a vulnerable buffer of said file; and
scanning said file for said suspect code by using said vulnerable buffer.

24. A method as recited in claim 19 further comprising:
setting a sensitivity setting to a particular setting; and
taking said action only when said sensitivity setting is at or above said particular setting.

25. A method as recited in claim 19, wherein the analyzing said suspect code to determine if said suspect code accesses the imagebase of kernel32.dll using a top-of-stack technique (TOS) includes examining whether the suspect code traces backwards in memory looking for a header.

26. A method as recited in claim 19, wherein the analyzing said suspect code to determine if said suspect code accesses the imagebase of kernel32.dll using a top-of-stack technique (TOS) is a static analysis performed without using an emulator.

* * * * *